J. T. CLARK.
RESILIENT VEHICLE TIRE.
APPLICATION FILED NOV. 18, 1912.
1,072,700.
Patented Sept. 9, 1913.
3 SHEETS—SHEET 3.
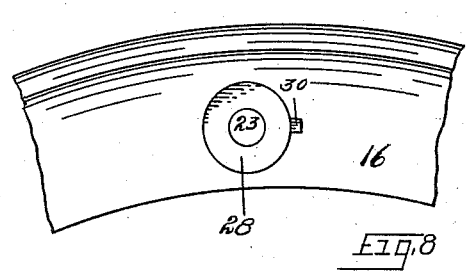
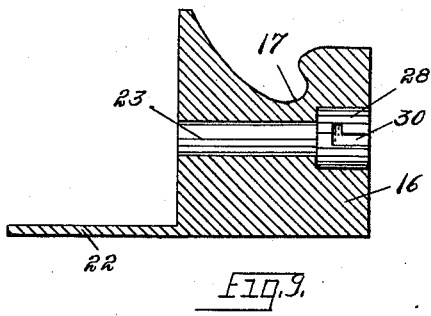
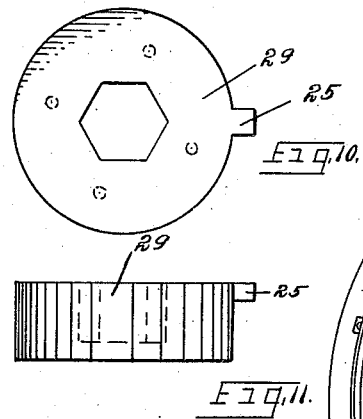
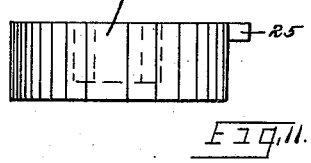
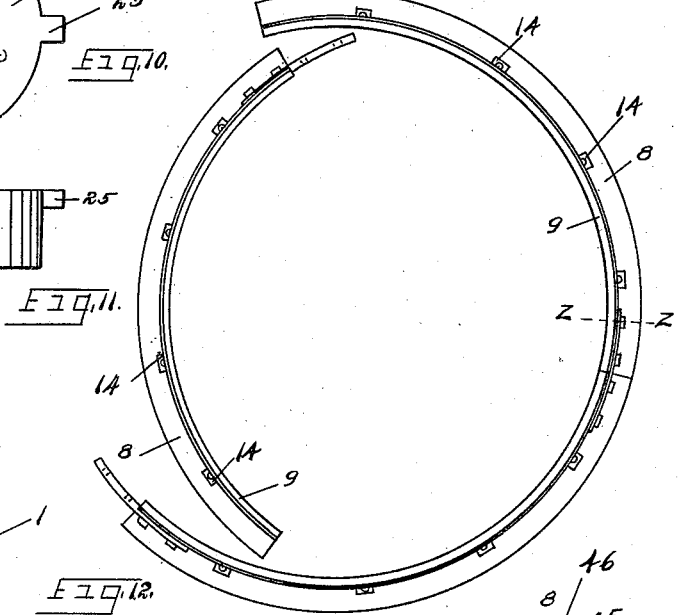
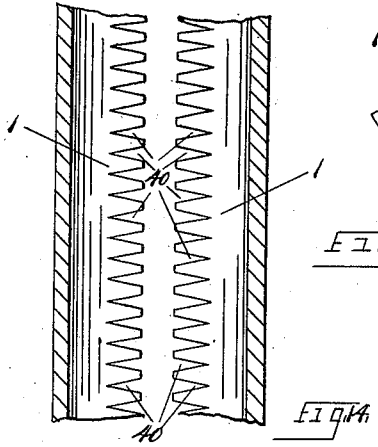
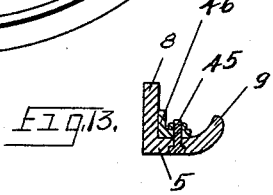
WITNESSES:
INVENTOR.
John T. Clark
BY
ATTORNEY.

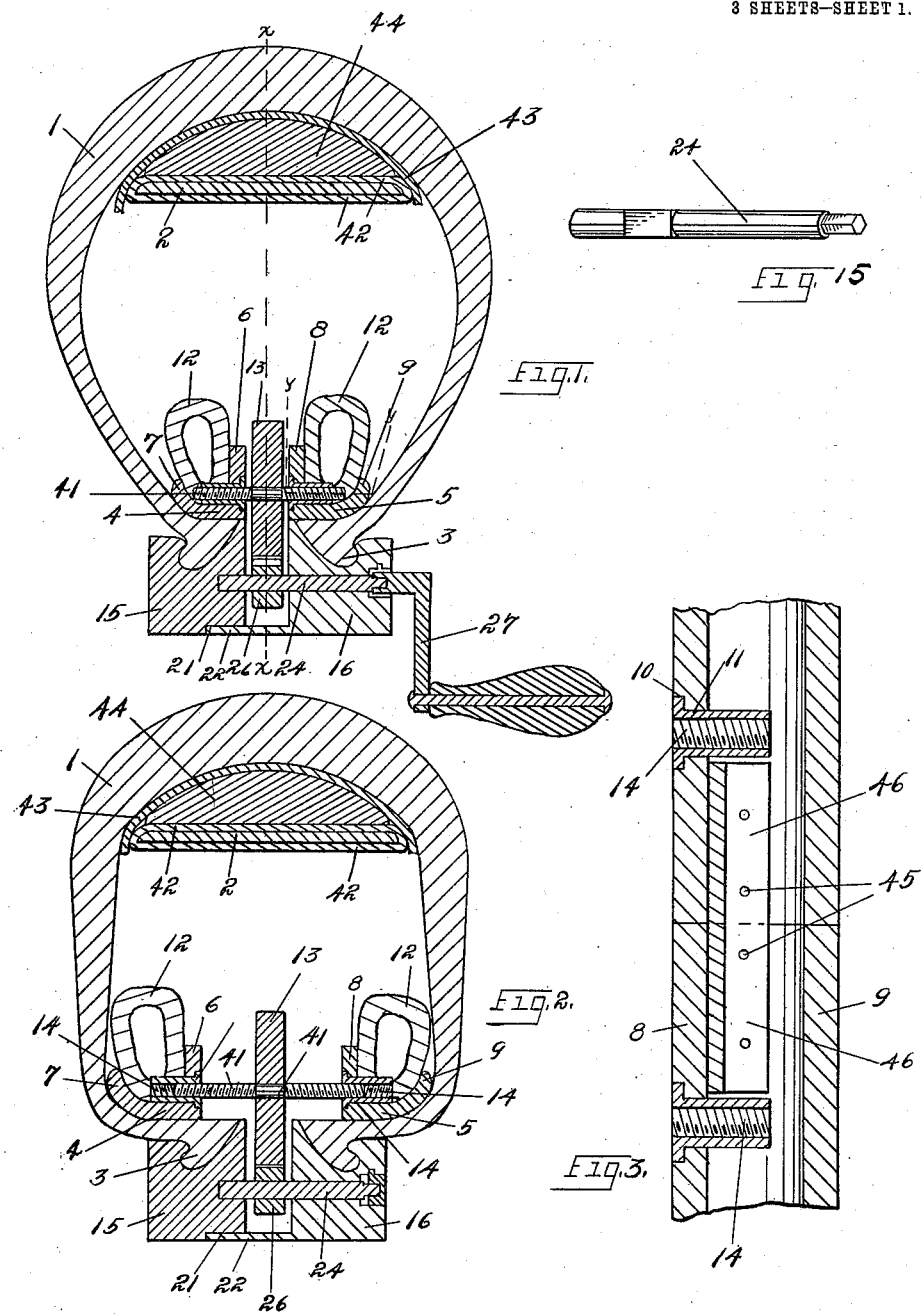

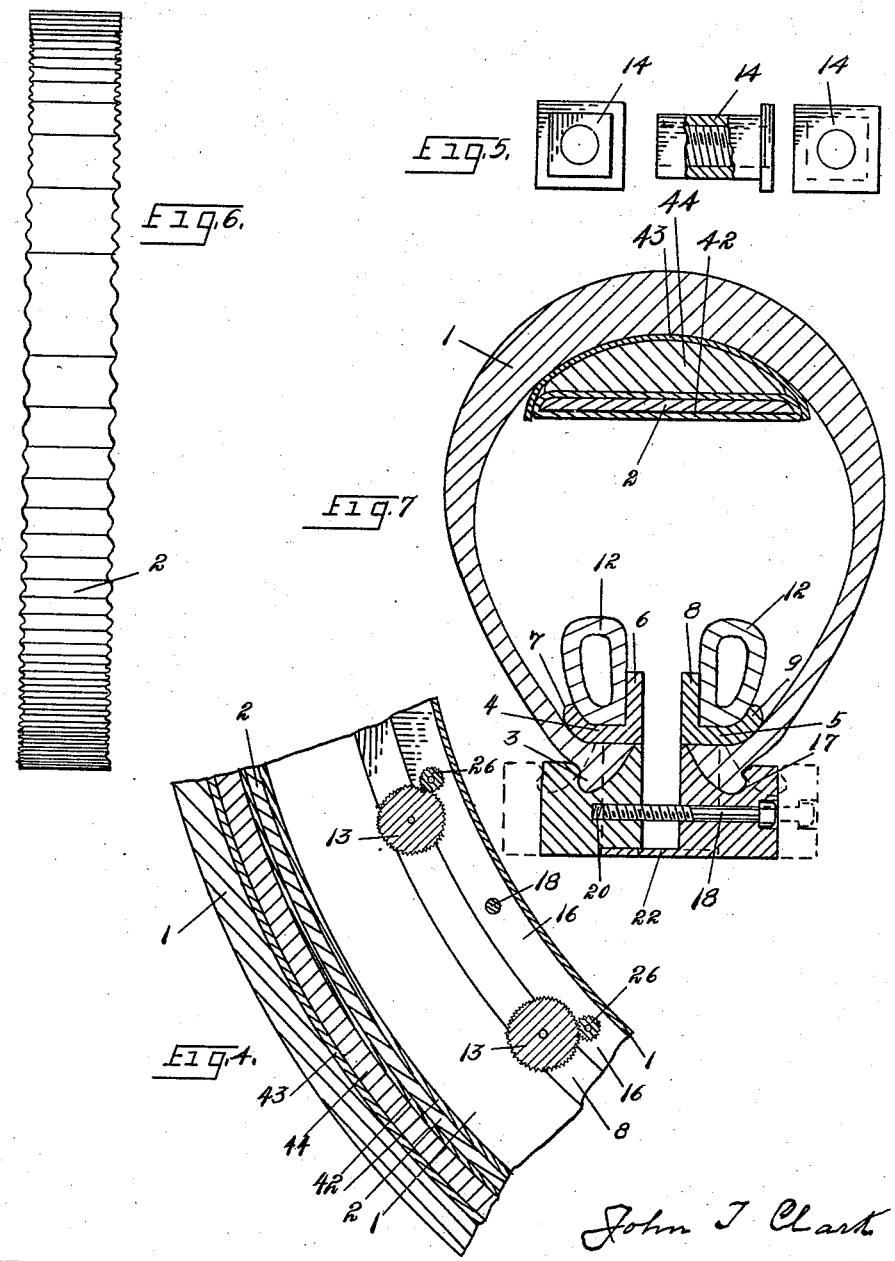

UNITED STATES PATENT OFFICE.

JOHN T. CLARK, OF PROVO, UTAH.

RESILIENT VEHICLE-TIRE.

1,072,700.     Specification of Letters Patent.     Patented Sept. 9, 1913.

Application filed November 18, 1912. Serial No. 732,178.

*To all whom it may concern:*

Be it known that I, JOHN T. CLARK, a citizen of the United States, residing at Provo, in the county of Utah and State of Utah, have invented certain new and useful Improvements in Resilient Vehicle-Tires, of which the following is a specification.

My invention relates to vehicle tires and has for its object to provide a tire which may be expanded by mechanical means to provide resiliency therein similar to the pneumatic tires now in use, and to provide a tire which will not collapse if punctured and in which the resiliency of the tire may be changed to suit the load carried on the vehicle. These objects I accomplish with the device illustrated in the accompanying drawings in which similar letters of reference indicate like parts throughout the several figures, and as described in the specifications forming a part of this application and specifically pointed out in the appended claims.

The preferred form of my invention is shown in the drawings in which—

Figure 1 is a transverse section on a radial line through the casing tensioning means with the wrench in place and before the outer casing is tightened. Fig. 2 is a vertical section on the same line after the casing has been tightened and the wrench removed. Fig. 3 is a fragmentary view of a portion of one of the channels showing a section on line $y$ $y$ of Fig. 1. Fig. 4 is a fragmentary view of a section of my tire on line $x$ $x$ of Fig. 1. Fig. 5 is a rear end, partial side elevation and front end view of the internally threaded sleeve nuts used on the turn-buckles. Fig. 6 is an elevation of the spring band. Fig. 7 is a vertical section on a radial line through the casing tightening means. Fig. 8 is a fragmentary view of one of the channel bands with the tensioning means removed. Fig. 9 is a section on a radial line through the same. Fig. 10 is an enlarged view of the locking cap-nut. Fig. 11 is a side elevation of the same. Fig. 12 is an elevation of one of the tensioning bands with a portion shown not secured in place. Fig. 13 is a section on the line $z$—$z$ of Fig. 12. Fig. 14 is a fragmentary view of the casing on a circumferential plane through the turn-buckles and looking toward the axis of the wheel showing the slitted edges of the casing. Fig. 15 is a view in perspective of one of the shafts to be mounted in the opening shown in Fig. 9.

My tire consists of an outer casing 1 within which an endless spring band 2 is secured. Said casing 1 has the edges thereof formed as a lug or rib 3 thereon. The lug portion of said casing has transverse slits 40 cut therein and without the tubular form, in order that the tensioning means which I use may be inserted within said casing. Within said casing 1 are placed, spaced apart, metal bands 4 and 5. Said band 4 has an outwardly extended flange 6 thereon at right angles to the axis of said band and also an outwardly extended flange 7 curved from the plane of said band. Said band 5 has an extended flange 8 thereon at right angles to the axis of said band and a flange 9 on the other edge thereof curved from the plane of said band.

Within the opposing side face of each of the flanges 6 and 8 are provided square recesses 10 and in the center of each recess 10 a square opening 11 is cut. The recess and opening in each of said flanges is in alinement with the recess and opening of the opposing flange. Seated within each of said recesses 10 is an internally threaded sleeve 14 having a portion thereof formed to fit within said recess 10, and another portion extending through the opening 11 and engaging in a tubular buffer 12 to be hereinafter explained. Between said flanges 6 and 8 are provided a number of spur gears 13 each of said gears being fastened on a turn-buckle 41 having right and left threads on each which engage with the threads in said sleeve 14, the purpose being to provide a turn-buckle for enlarging the space between said flanges and to supply, by means of the gear 13, a means of rotating the turn-buckles within the threaded sleeves. Concentrically placed within said bands 4 and 5 are two annular bands 15 and 16 each of which has a channel 17 formed in the peripheric face thereof within which channels are fitted the edges of said outer casing 1. The outer side of each of said channels 17 engages the lugs 3 on the edge of said outer casing. Said annular bands 15 and 16 have alined openings therethrough, within which openings are placed the threaded bolts 18. The opening 19 in one of said bands extends entirely through the band and is not threaded, while its respective alined opening 20 in the other band is tapped out and threaded. Said bands 15 and 16 are drawn together by the screwing in of said bolts 18 and thereby binding said casing 1 in the tubular form shown in Fig. 1. The inner annular face of said band 15 has an annular recessed channel 21 cut therein, with one side removed, to receive the annular flange 22 which is integrally formed on said band 16. When said bands 15 and 16 are drawn together by the bolts 18 and the flange 22 is seated in the annular recessed channel 21, the interior of the said casing 1, which has been made to assume a partially tubular form, is inclosed, thereby preventing water, dust or mud from entering the tubular cavity of said casing. Other alined openings 23 are provided in said annular bands 15 and 16 within each of which is journaled a tightener shaft 24. A portion of said shaft 24 is squared and slidably fitted within a pinion 26, the teeth of which mesh with the teeth of said gear 13. Said shaft 24 has the outer end made in square or hexagon shape and on which is made to operate a crank wrench 27, by means of which said pinion 26 and shaft 24 may be rotated. The outer faces of said annular bands 15 and 16 contiguous said openings 23 are cut out to form a recess 28 to receive the end of said crank wrench 27 when the wrench is in use. Said recess 28 is preferably made in circular form, except at one point where it is extended beyond the circumference of said circle to cut a locking channel 30 in the wall of said annular band, which channel is in L-shape. A locking cap 29 is made to seat within said recess 28 and to engage the square end of said shaft 24 and each of said caps has an extended lug 25 which seats within the locking channel 30 to hold said caps in place. Within said casing 1 and engaged by the free ends of said sleeves 14, are two hollow buffer bands 12 placed parallel with said bands 4 and 5. The periphery of each of said buffer bands extends beyond the said gear wheels 13 to prevent said spring band 2 from contacting with said gear wheels when under excessive loads and radial compression. The said spring band 2 has the edges thereof cut in parallel waved lines, with uniform convolutions. Said spring band is covered with a wrapping of rubber coated fibrous material 42 which closely conforms to and contacts with the edges of said band, and when said coating 42 is cemented to a layer of rubberized fabric 43, it will prevent any tendency of said band 2 to creep. A flexible band 44 made of soft rubber, or other flexible and resilient material is placed between said fabric 43 and said band 2 to fill the space between the inner peripheral face of said casing 1 and said band.

The assembling and operation of my tire is as follows:—Said bands 4 and 5 may be each assembled, if segregated as shown in Fig. 12, by bolting the segments together to form a circle, by means of bolts 45 being screwed through the said bands and a brace piece 46, which laps the meeting ends of said segments. The assembling may be within or without the tubular cavity of said casing. The threaded sleeves 14 are screwed upon said turn-buckle 41, and said turn-buckles are placed in position within the gears 13 and between said flanges 6 and 8 and with the sleeves 14 within the recesses 10 and holes 11, and engaging in the said hollow buffer bands 12. The said pinions 26 are slidably fitted on the squared portion of said shafts 24 and the cylindrical end of said shafts placed within the openings 23 in the band 15. The said annular bands 15 and 16, engaging the lugs 3 on the edges of said casing, are next drawn into position concentrically within said bands 4 and 5 by screwing the bolts 18 through the band 16 and into the threaded openings 20 in said band 15. When the said bolts 18 are screwed up, the said flange 22 will engage in the shouldered recess 21 and close the tubular cavity within said casing 1, the shafts 24 will extend partially through the band 16 and the squared head thereon, enter the recess 28. The turning of said shaft 24 by means of a wrench 27 will rotate the gear wheel 13 through the pinion 26, and the turn-buckles will be rotated within the sleeves 14. Said movement of the turn-buckles in one direction will increase the space between the said flanges 7 and 9, and cause the said casing to assume the form shown in Fig. 2. When said bands 4 and 5 are held in this position by said turn-buckles I am able to secure, by mechanical means, a resiliency in the tire similar to that accomplished with an air inflated tire. A reverse movement of said turn-buckles and their connected elements will decrease the space between the flanges 7 and 9, and cause the casing to assume the position shown in Fig. 1. To lock said turn-buckles, and in order that my tire may have a smooth, neat side face, I provide a locking cap-nut 29 which engages the head of said shaft 24 and has a radially extended lug 25 thereon which enters the vertical portion of the L-shaped locking channel 30, and by a slight backward turn of said cap-nut 29 and the shaft 24, the said cap-nut is locked against unintentional removal by means of the said lug engaging the lateral portion of said channel 30. Said cap-nuts 29 may be given said backward turn by means of recesses in the face thereof, as shown in dotted lines in Fig. 10. A recess may be provided for the head of the bolts 18 and a closure cap for said recess may be fitted therein similar to the ones used over the shaft 24 if desired. The flange 22 and that portion of said band 16 in alinement therewith may be severed from said band and used in the same place and for the same purposes as though integral with said band as shown.

Having thus described my invention I desire to secure by Letters Patent and claim:

1. A resilient tire for vehicles consisting of an outer tubular casing; a spring band within said casing; two channel bands adjustably spaced apart and held concentrically within said spring band by said casing, and provided in their adjacent faces with alined square openings; internally threaded sleeve-nuts in said openings, the sleeve-nuts in one band having right, and those in the other band having left hand threads; turn-buckles threaded to engage said sleeve-nuts and adapted when rotated to adjust the space between said channel bands; a spur gear carried on each turn-buckle; and means to hold the edges of said outer casing in a fixed relation to each other, said means consisting of two annular bands; and means to rotate said turn-buckles and thereby to adjust the space between said channel bands; said means consisting of shafts mounted in said annular bands; a pinion on each of said shafts, the teeth of which mesh with the teeth of the spur gear; and means to rotate said shaft.

2. A resilient tire for vehicles consisting of a tubular casing; a spring band within said casing; two channel bands adjustably spaced apart and concentrically held within said spring band by said casing and provided in their adjacent faces with alined square openings; internally threaded sleeves in said openings, the sleeves in one band having right, and those in the other band having left hand threads; tubular buffer bands concentrically held within said channel bands by engagement with said sleeves; turn buckles threaded to engage said sleeves and adapted when rotated to adjust the space between said channel bands; and means to adjust and hold the edges of said casing in fixed relation to said spring band.

In testimony whereof I have affixed my signature in presence of two witnesses.

JOHN T. CLARK.

Witnesses:
SAM RANEY,
W. R. WILLIAMS.

---

Copies of this patent may be obtained for five cents each, by addressing the "Commissioner of Patents, Washington, D. C."